(12) United States Patent
Shin

(10) Patent No.: US 9,743,172 B2
(45) Date of Patent: Aug. 22, 2017

(54) EARSET USING EAR-INSERTION-TYPE MICROPHONE

(71) Applicant: HAEBORA, Seoul (KR)

(72) Inventor: Doo Sik Shin, Seoul (KR)

(73) Assignee: HAEBORA, Seoul (KR)

( * ) Notice: Subject to any disclaimer, the term of this patent is extended or adjusted under 35 U.S.C. 154(b) by 0 days.

(21) Appl. No.: 15/066,687

(22) Filed: Mar. 10, 2016

(65) Prior Publication Data

US 2016/0198253 A1    Jul. 7, 2016

Related U.S. Application Data

(62) Division of application No. 14/388,007, filed as application No. PCT/KR2012/009489 on Nov. 9, 2012, now Pat. No. 9,654,858.

(30) Foreign Application Priority Data

Mar. 29, 2012 (KR) .................. 10-2012-0032209
Jul. 17, 2012 (KR) .................. 10-2012-0077911

(51) Int. Cl.
*H04R 1/10* (2006.01)
*H04R 5/033* (2006.01)
(Continued)

(52) U.S. Cl.
CPC ........... *H04R 1/1041* (2013.01); *G06F 3/167* (2013.01); *G10L 21/0208* (2013.01);
(Continued)

(58) Field of Classification Search
CPC .. H04R 1/1091; H04R 1/1041; H04R 1/1016; H04R 1/1083; H04R 3/005; H04R 5/033;
(Continued)

(56) References Cited

U.S. PATENT DOCUMENTS

| 6,374,126 B1* | 4/2002 | MacDonald, Jr. ...... H04M 1/05 381/309 |
| 2009/0209304 A1* | 8/2009 | Ngia .................... H04R 1/1091 455/575.2 |
| 2013/0110521 A1* | 5/2013 | Hwang ............... H04W 52/028 704/500 |

FOREIGN PATENT DOCUMENTS

| JP | 2008-283326 A | 11/2008 |
| KR | 10-2000-0018098 A | 4/2000 |

(Continued)

OTHER PUBLICATIONS

International Search Report mailed on Feb. 27, 2013 for PCT/KR2012/009489.

*Primary Examiner* — Leshui Zhang
(74) *Attorney, Agent, or Firm* — Studebaker & Brackett PC

(57) ABSTRACT

The present disclosure relates to an earset including at least: a first earphone portion containing a first speaker that outputs sound signals or voice signals provided from an external device and a first microphone that receives user's voice signals provided via a user's external auditory canal and configured to be able to be inserted into an external auditory canal of a user; a second earphone portion containing a second speaker that outputs sound signals or voice signals provided from an external device and configured to be able to be inserted into a second external auditory canal of a user; and a main body connected with the first earphone portion and the second earphone portion and configured to be able to set up a calling mode or a playing mode.

4 Claims, 15 Drawing Sheets

(51) Int. Cl.
*G10L 21/0208* (2013.01)
*H04R 3/00* (2006.01)
*G06F 3/16* (2006.01)
*H04M 1/60* (2006.01)

(52) U.S. Cl.
CPC ........ *H04M 1/6058* (2013.01); *H04R 1/1016* (2013.01); *H04R 1/1091* (2013.01); *H04R 3/005* (2013.01); *H04R 5/033* (2013.01); *G10L 2021/02082* (2013.01); *G10L 2021/02087* (2013.01); *H04R 1/1083* (2013.01); *H04R 2201/107* (2013.01); *H04R 2201/109* (2013.01); *H04R 2400/01* (2013.01); *H04R 2420/07* (2013.01); *H04R 2499/11* (2013.01)

(58) Field of Classification Search
CPC ........ H04R 2201/107; H04R 2201/109; H04R 2400/01; H04R 2420/07; H04R 2499/11; H04R 1/10; H04R 29/00; H04R 29/001; H04R 29/002; H04R 29/003; H04R 29/004; H04R 29/005; H04R 29/006; H04R 29/007; H04R 25/30; H04R 25/305; H04R 25/70; G10L 21/0208; G10L 2021/02087; H04M 1/6041; H04M 1/6058; H04M 1/6066; H04M 1/05; H04M 2250/02; H04B 1/385; H04B 1/05; H04B 1/6058; H04B 1/6066; H04S 1/005
USPC .... 381/74, 73.1, 309, 312–322, 328, 58–60; 455/569.1, 569.2, 570, 575.2; 700/94
See application file for complete search history.

(56) References Cited

FOREIGN PATENT DOCUMENTS

| | | |
|---|---|---|
| KR | 10-2001-0088886 A | 9/2001 |
| KR | 20-0426390 Y1 | 9/2006 |
| KR | 10-2007-0105555 A | 10/2007 |
| KR | 20080072324 A * | 8/2008 |
| KR | 10-1092957 B1 | 12/2011 |
| KR | 10-1092958 B1 | 12/2011 |
| KR | 10-1109748 B1 | 2/2012 |

* cited by examiner

EARSET USING EAR-INSERTION-TYPE MICROPHONE

CROSS-REFERENCE TO RELATED APPLICATION

The present application is a Divisional Application of U.S. patent application Ser. No. 14/388,007, which is a U.S. National Phase Entry of International Patent Application No. PCT/KR2012/009489, filed Nov. 9, 2012, which is based upon and claims the benefit of priority to Korean Patent Applications Nos. 10-2012-0077911, filed on Jul. 17, 2012, and 10-2012-0032209, filed on Mar. 29, 2012. The disclosures of the above-listed applications are hereby incorporated by reference herein in their entirety.

TECHNICAL FIELD

The present disclosure relates to a wired and wireless earset using an ear-insertion-type microphone, and more particularly, to a wired and wireless earset using an ear-insertion-type microphone that enables listening to good-quality sound by blocking external noise when providing voice signals that are provided through the ear to the other end or when controlling a voice recognition device, allows effective calls in a noisy environment by increasing a recognition rate of the voice recognition device and controls a microphone and/or a speaker depending on signals received from an external device.

RELATED ART

Generally, an earset is used being worn on a user's ear while it is wire or wireless connected with an external device (e.g. mobile devices such as a portable media player, mobile communication terminal, smartphone, etc.) for the purpose of listening of a sound or communication of voice signals.

However, users find it difficult to communicate with the other side in a noisy or stormy environment since traditional earsets are exposed to the outside, and the distance between a speaker and a microphone must be constantly maintained so as to prevent oscillation; thus it is hard for traditional earsets to be downsized.

In detail, the earset comprises a connector combined with an external device, a control portion electrically connected with the connector that sets up user modes of the earset and controls general motions of the earset, and a phone means electrically connected with the control portion, being worn on a user's ear, that performs voice output or voice input.

Prior arts are disclosed in the Korean Patent Application No. 10-2000-0018098 (Insert microphone/circumaural type microphone) and 10-2001-0088886 (Audio signal input/output device and earphoneemploying microphone) and the Korean Patent No. 10-1092957 (Microphone) and 10-1109748 (Microphone).

However, traditional earsets using the prior arts do have echo or howling since, when a user communicates with the other side via a phone, the voice of the other side comes out of speakers and enters again into a microphone, thus making it hard to deliver a voice clearly.

Moreover, when a user listens to music or watches a movie, a user's voice enters into a microphone and comes out of speakers since the microphone is arranged either at one side of ears or both ears for the purpose of outputting stereo sounds to both ears, thus hindering the user from listening sounds clearly.

TECHNICAL ISSUE

To resolve the issues presented above with the necessity of technical development, the present disclosure is invented. A purpose of the present disclosure is to provide a wired and wireless earset using an ear-insertion-type microphone with a quality of sound even in a noisy environment.

Another purpose of the present disclosure is to provide a wired and wireless earset using an ear-insertion-type microphone with clear sound by blocking external noise with an echo offset means in the case of sending voice messages to the other side so as to block echo or howling effect, or by outputting a constant quality of stereo sound in the case of playing a song.

Furthermore, another purpose of the present disclosure is to provide a wired and wireless earset using an ear-insertion-type microphone that, in order to prevent echo during a phone call by figuring out manually or automatically whether it is either on calling or playing a song, adjusts at least one of the following: speaker output or microphone reception.

Yet another purpose of the present disclosure is to provide a wired and wireless earset using an ear-insertion-type microphone that is easy to control in a noisy environment by blocking external noise in the case of controlling a voice recognition device by voice signals provided via the ear so as to enhance recognition of the voice recognition device.

Still another purpose of the present disclosure is to provide a wired and wireless earset using an ear-insertion-type microphone that is applicable to both wired earphones and wireless earphones, and that enables a user to select microphone switches manually or automatically, thus increasing user's satisfaction.

However, a purpose of the present disclosure is not construed to be limited only to the purposes described above, and with the descriptions below, another purpose not presented herein is clearly understood by one of ordinary skill in the art to which the present disclosure belongs.

SUMMARY

In accordance with some features to achieve the assignment resolving the technical issues, the present disclosure provides a wired and wireless earset using an ear-insertion-type microphone. The earset includes at least: a first earphone portion containing a first speaker that outputs sound signals or voice signals provided from an external device and a first microphone that receives user's voice signals provided via a user's external auditory canal and configured to be able to be inserted into an external auditory canal of a user; a second earphone portion containing a second speaker that outputs sound signals or voice signals provided from an external device and configured to be able to be inserted into a second external auditory canal of a user; and a main body connected with the first earphone portion and the second earphone portion and configured to be able to set up a calling mode or a playing mode.

In accordance with some additional features, the present disclosure provides a wired and wireless earset using an ear-insertion-type microphone. The earset includes at least: a first earphone portion containing a first speaker that outputs sound signals or voice signals provided from an external device and a first microphone that receives user's voice signals provided via a user's external auditory canal and configured to be able to be inserted into a first external auditory canal of a user; a second earphone portion containing a second speaker that outputs sound signals or voice signals provided from an external device and configured to be able to be inserted into a second external auditory canal of a user; and a main body connected with the first earphone portion and the second earphone portion and, at the same time, wire or wireless connected with an external device.

EFFECTS OF INVENTION

As described above, according to an earset of the present disclosure, since the arrangement of speakers and microphones are unified, a user can have a call with the other side with clearance even in a noisy or stormy environment thus enhancing user convenience. That is, in a noisy environment, an earset is worn on an external auditory canal of a user so as to provide voice signals with no surrounding noise of the user to an external device, thus making a clear calling with the other side and, by applying the same technology to voice recognition devices, increasing voice recognition.

Furthermore, in an environment with weak noise, the earset provides voice signals provided from user's mouth into external devices, thus reducing a nasal tone that occurs when a user makes a phone call using a microphone of an earphone portion worn on an ear and resolving low volume at the same time.

Furthermore, since it collects sound from both ears through microphones arranged at both earphone portions, the earset easily amplifies voice signals with no additional amplifier, thus reducing inconvenience with low volume during a phone call.

Furthermore, by using an echo offset means, the earset provides voice signals provided via the ear to the other side and, when controlling a voice recognition device, blocks external noise, thus blocking echoing or howling effect.

Furthermore, the earset adjusts at least one of either speaker output or microphone reception, thus blocking external noise so as to block echoing or howling effect.

Furthermore, not only during a call but also during a receiving and listening of music, the earset outputs stereo sound into both ears, thus maintaining the quality of sound output.

[Description for Mark]

| | |
|---|---|
| 100: earphone portion | |
| 110: first earphone portion | 120: second earphone portion |
| 200: main body | |
| 210: signal transceiving portion | 220: control portion |
| 230: microphone switch | 240: echo offset means |
| 310: first speaker | 320: second speaker |
| 410: first microphone | 420: second microphone |
| 500: connector | |

DETAILED DESCRIPTION

A wired and wireless earset using ear-insertion-type microphone will be described more fully hereinafter with reference to the accompanying drawing, in which some embodiments are shown. Advantages and features of some embodiments accomplishing the same are hereafter detailed with reference to the accompanying drawings.

However, a wired and wireless earset using ear-insertion-type microphone is embodied in different forms and should not be construed as limited to the embodiments set forth herein. Rather, these embodiments are provided so that this disclosure will be thorough and complete, and will fully convey the scope of the wired and wireless earset using ear-insertion-type microphone to those skilled in the art. The present disclosure is only defined by the scope of claims.

Also, it is noted that the use of any and all examples, or exemplary terms provided herein is intended merely to better illuminate the wired and wireless earset using ear-insertion-type microphone and is not a limitation on the scope of the wired and wireless earset using ear-insertion-type microphone unless otherwise specified. Further, unless defined otherwise, all terms defined in generally used dictionaries may not be overly interpreted. The use of the terms "a" and "an" and "the" and similar referents in the context of describing the wired and wireless earset using ear-insertion-type microphone (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Unless defined otherwise, all technical and scientific terms used herein have the same meaning as commonly understood by one of ordinary skill in the art to which this application belongs.

A detailed description of the wired and wireless earset using ear-insertion-type microphone is hereafter presented with reference to the accompanying drawings. The same reference numbers indicate the same component throughout the specification.

For an example, a speaker and a microphone equipped at a first earphone portion 110 is described as a first speaker S1, 310 and a first microphone M1, 410 respectively; a speaker and a microphone equipped at a second earphone portion 120 as a second speaker S2, 320 and a second microphone M2, 420 respectively; and a microphone equipped at a main body 200 as a third microphone M3, 430.

Figure 1:
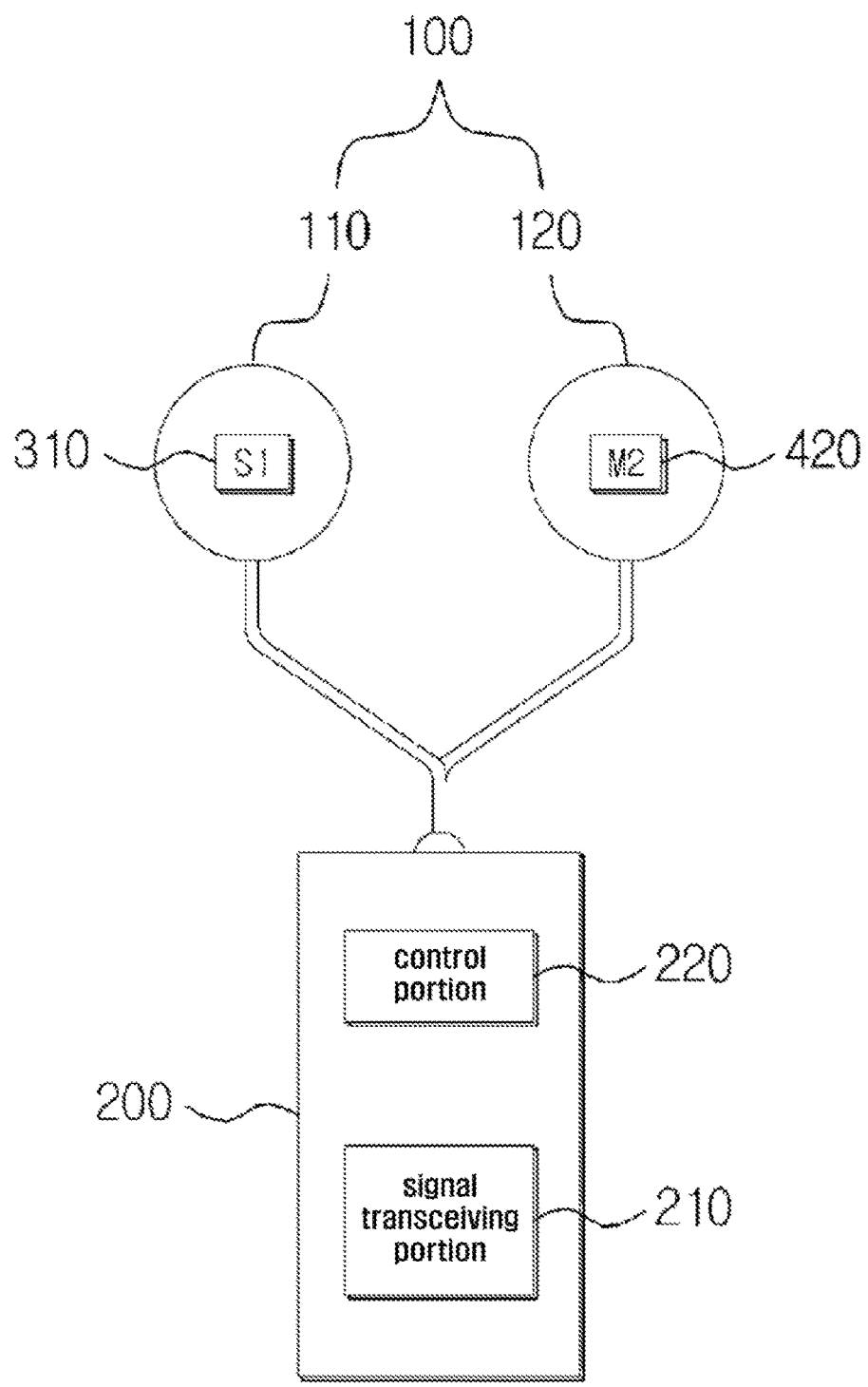
FIG. 1 is a first embodiment of the earset, wherein it is wireless connected with an external device.

FIG. 1 is a first embodiment of the earset connected wherein it is wireless connected with an external device.

As shown in FIG. 1, the earset contains an earphone portion 100 and a main body 200.

Herein, the earphone portion 100 contains a first earphone portion 100 inserted into user's first external auditory canal and a second earphone portion 120 inserted into user's second external auditory canal, wherein the first earphone portion 110 and the second earphone portion 120 are connected with a main body 200 with a wire.

A first speaker 310 that outputs sound or voice signals provided from external device (not present) such as a mobile phone or an MP3 player is equipped at the first earphone portion 110, and a second microphone 420 that receives user's voice signals provided from user's external auditory canal is equipped at the second earphone portion 120.

For the second microphone 420, it receives signals generated from user's ear during his or her speaking, and it is preferred to be composed with directional microphone.

The main body 200 is connected with an external device (not presented) wirelessly, containing a signal transceiving portion 210 that transceives signals with external devices; and a control portion 220 that transmits voice signals received from the first microphone 410 into the external device via the signal transceiving portion 210 and outputs the received voice signals from the external devices via the signal transceiving portion 210 into the first speaker 310.

The earset further contains a volume controlling portion (not presented) that controls volume and a call button portion (not presented) that determines whether to have a call.

Moreover, the control portion 220 further contains a function of transmitting user's voice signals received from the second microphone 420 via the signal transceiving portion 210 into a voice recognition device (not presented).

Figure 2:
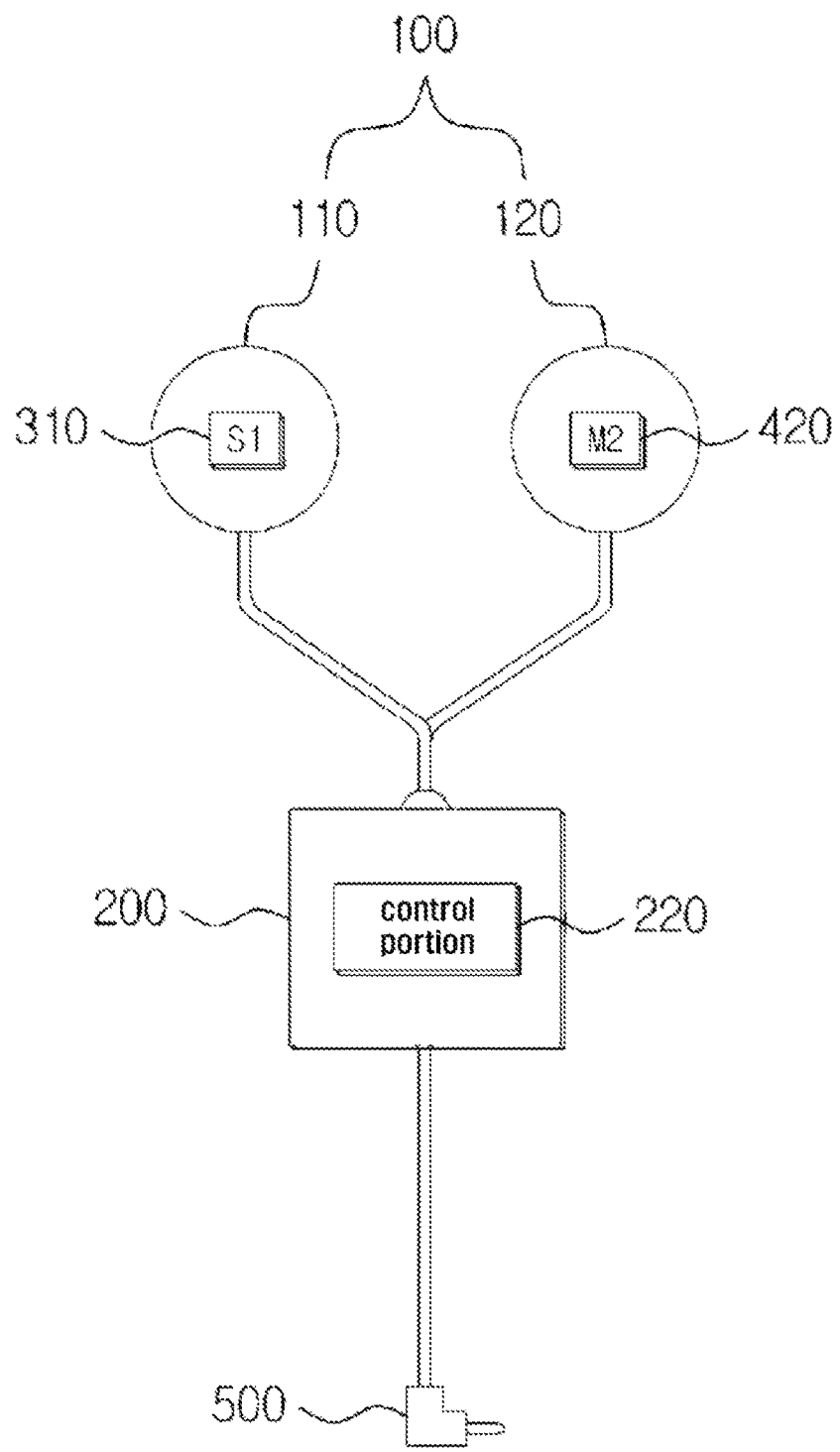
FIG. 2 is a second embodiment of the earset, wherein it is wire connected with an external device.

FIG. 2 is a second embodiment of the earset, wherein it is wire connected with an external device.

As shown in FIG. 2, if the main body 200 is wire connected with an external device (not presented) via a connector 500, a signal transceiving portion 210 is removed from the composition of the first embodiment.

Herein, the control portion 220 further contains a function of direct transmitting of user's voice signals received from the second microphone 420 into a voice recognition device (not presented).

Figure 3:
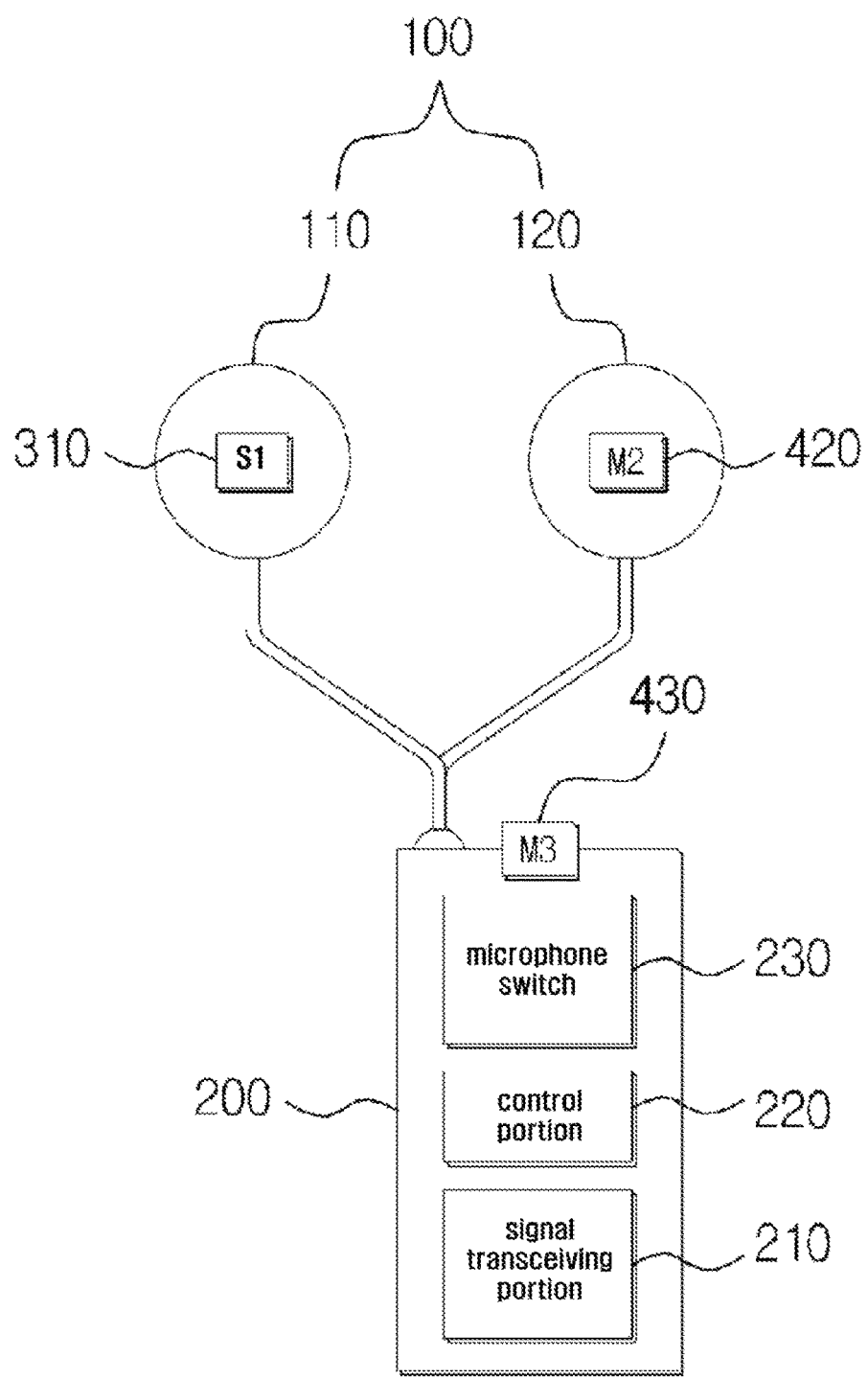
FIG. 3 is a third embodiment of the earset.

FIG. 3 is a third embodiment of the earset.

As shown in FIG. 3, in addition to the composition of the first embodiment, the earset further contains a third microphone 430 that receives voice signals provided from a user's mouth; and a microphone switch 230 to select either the second microphone 420 or the third microphone 430.

The microphone switch 230 selects the second microphone 420 if a level of detected noise signal under the control of the control portion 220 is the predetermined level or exceeds it, and it selects the third microphone 430 if the level is below the predetermined level. Moreover, it also selects a microphone in accordance with a detection level of a user of an external device.

For an example, a control portion 220 controls the microphone switch 230 so as to select the second microphone 420 if the predetermined level of noise signals preset by a designer or user of the earset reaches or exceeds a predetermined value (for instance, 70 dB) and select the third microphone 430 if the predetermined level is below that predetermined value. Thus, a user of the earset makes a call with convenience regardless of surroundings.

Herein, a designer or user of the earset sets the level of noise in a various way following his or her selection.

The microphone switch 230 is manually controlled by a user, and in order for the microphone switch 230 to operate automatically by the criteria above, the main body 200 has a voice recognition sensor or a motion recognition sensor and the microphone switch 230 operates automatically according to an output signal of a voice recognition sensor or a motion recognition sensor.

The third microphone 430 is exposed to the outside of the main body 200 so as to receive voice signals provided from a user's mouth, and in some embodiments, it is composed of an omnidirectional microphone.

If the earset is applied to voice recognition devices such as mobile phones, robots, navigations and industrial machinery, a function of transmitting user's voice signals received from the second microphone 420 into a voice recognition device (not presented) via the signal transceiving portion 210 is further contained to the earset. Therefore, the earset controls a voice recognition device by exploiting a user's voice from the ear.

Figure 4:
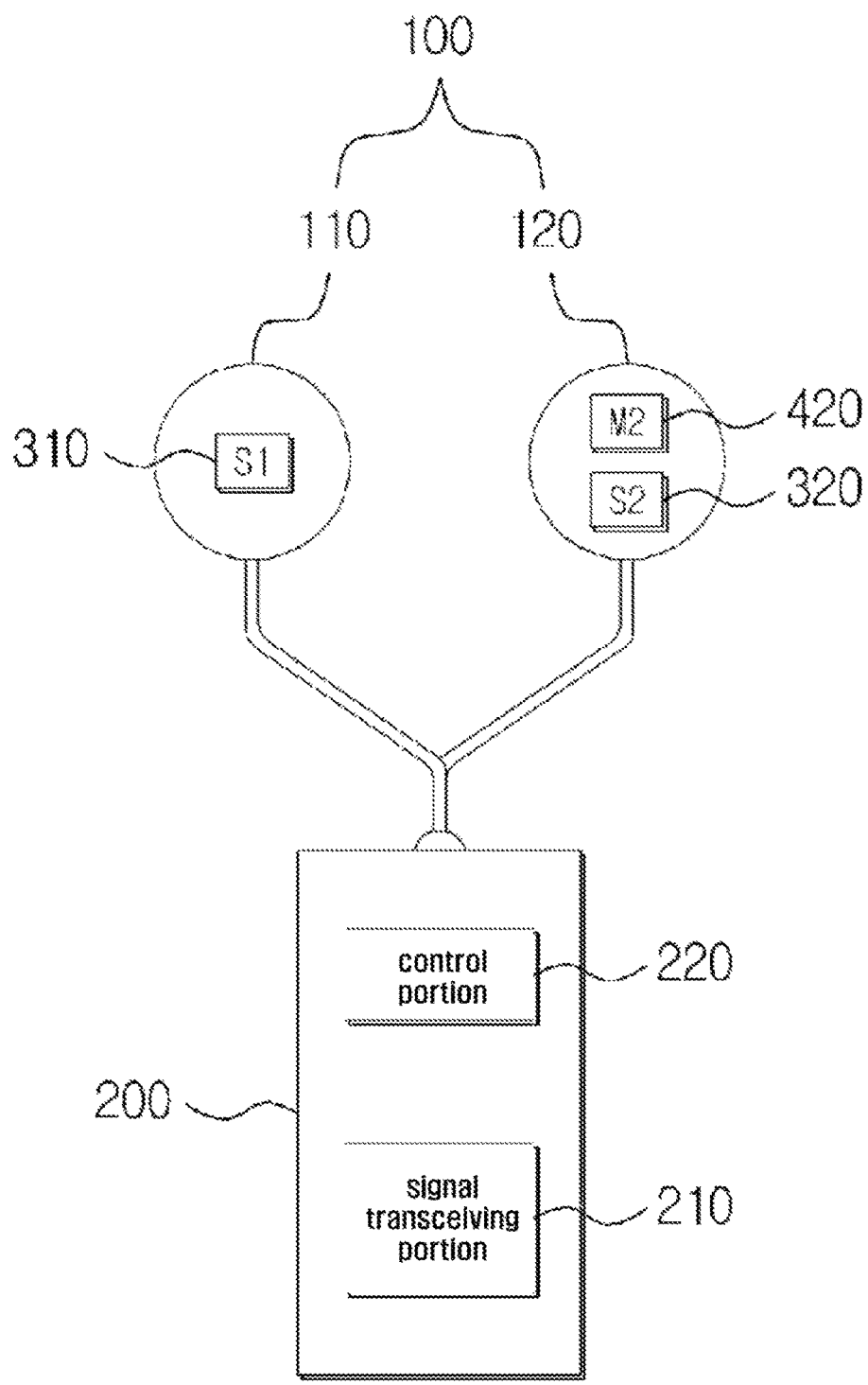
FIG. 4 is a fourth embodiment of the earset, wherein it is wireless connected with an external device.
Figure 5:
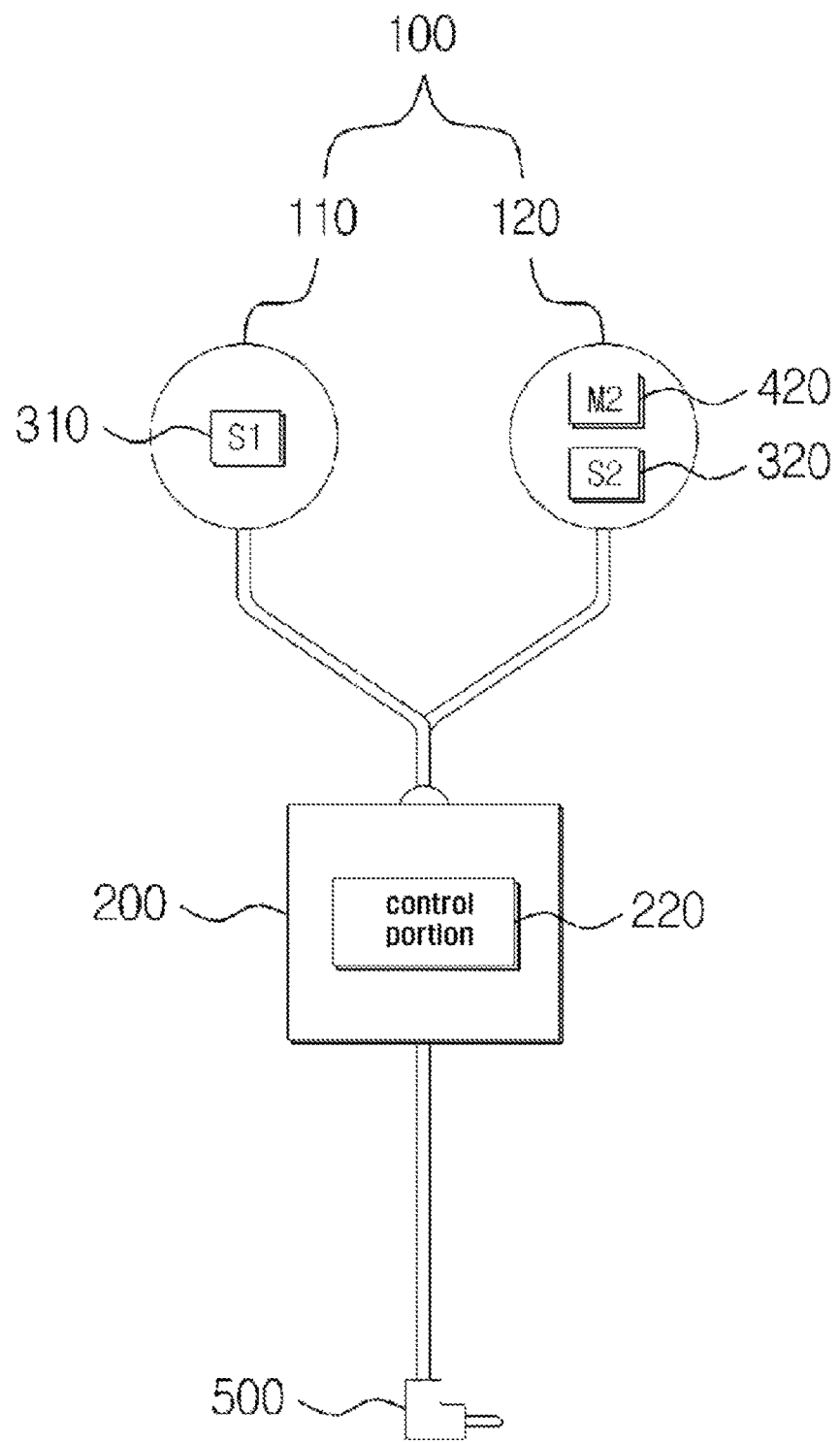
FIG. 5 is a fourth embodiment of the earset, wherein it is wire connected with an external device.

FIG. 4 and FIG. 5 are a fourth embodiment of the earset.

As shown in FIG. 4, the first earphone portion 110 further contains a first speaker 310 and a first microphone 410, and the second earphone portion 120 further contains a second speaker 320 that outputs sound signals or voice signals provided from external devices.

Herein, since an output of the first speaker 310 is transmitted as an input of the first microphone 410, an echo effect occurs when a user makes a call with the other side. To reduce the echo effect, an output adjusting circuit (not presented) is further contained. Moreover, the echo effect is prevented as well as external noise is blocked by adjusting reception of the first microphone 410. Also, to have the same effect, an output of the first speaker 310 and reception of the first microphone 410 can be adjusted at the same time.

Figure 8:
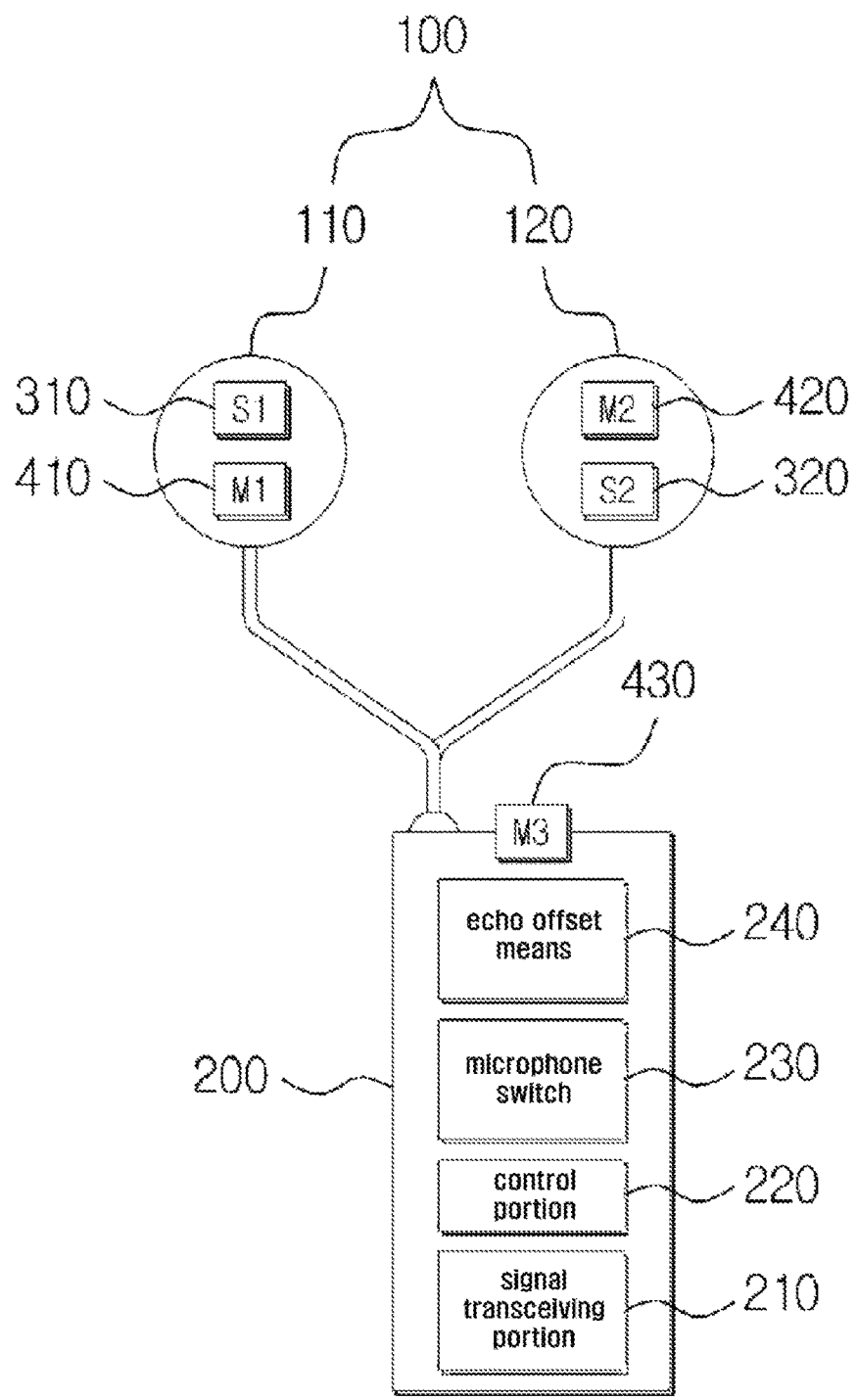
FIG. 8 is a seventh embodiment of the earset.

Meanwhile, the earphone portion 110 or the main body 200 further contains an echo offset means 240, FIG. 8 that reduces the echo factor included among the signal received from the first microphone 410.

Figure 9:
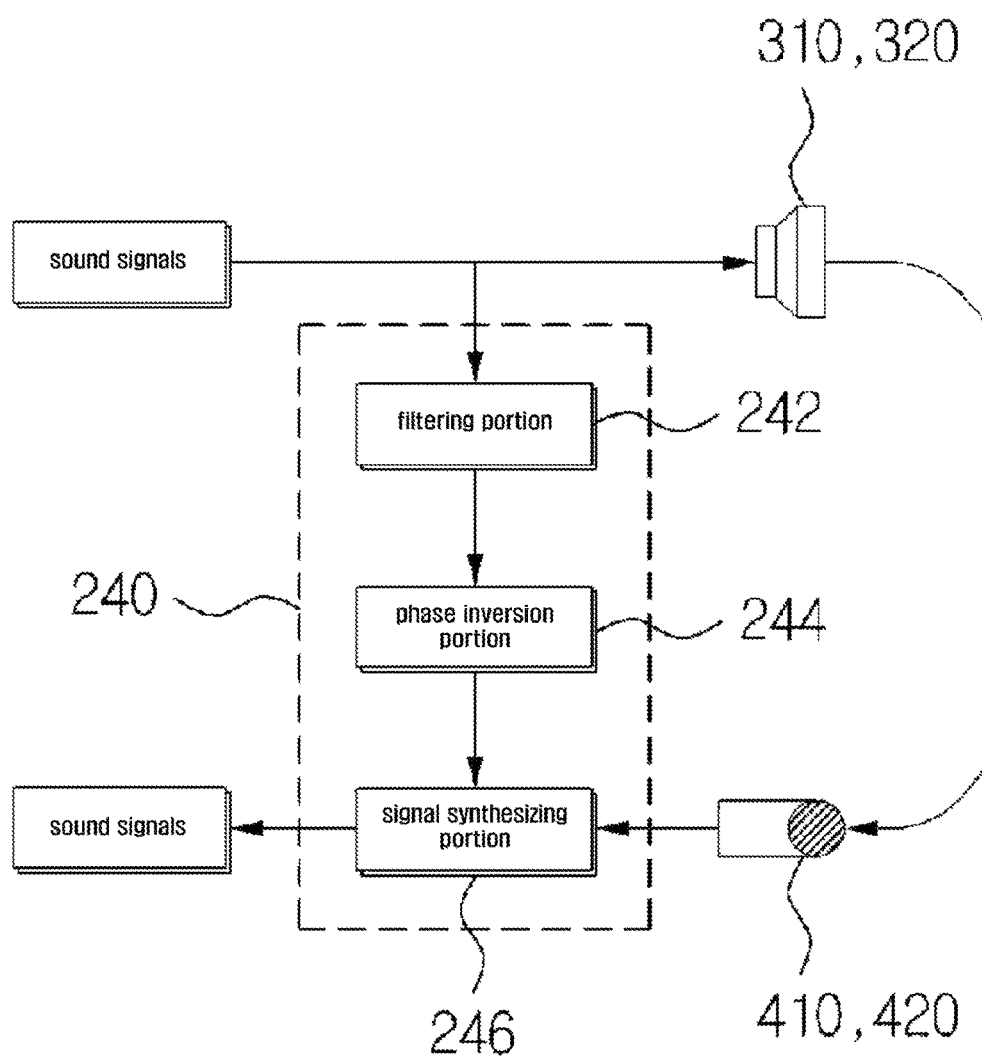
FIG. 9 is an embodiment that illustrates an echo offset means.

As shown in FIG. 9, the echo offset means 240 contains a filtering portion 242 that receives and filters sound signals or voice signals provided from external devices to a first speaker 310, a phase inversion portion 244 that reverses sound or voice signals filtered and outputted from the filtering portion 242, and a signal synthesizing portion 246 that synthesizes sound or voice signals outputted from the phase inversion portion 244 in a phase-reversal way and inputted from the first microphone 410.

As shown in FIG. 5, if the main body 200 is wire connected via a connector 500 with an external device (not presented), a signal transceiving portion 210 is removed from the fourth embodiment in FIG. 4.

Herein, the control portion 220 further contains a function of direct transmitting of user's voice signals received from the first microphone 410 into a voice recognition device (not presented).

Figure 6:
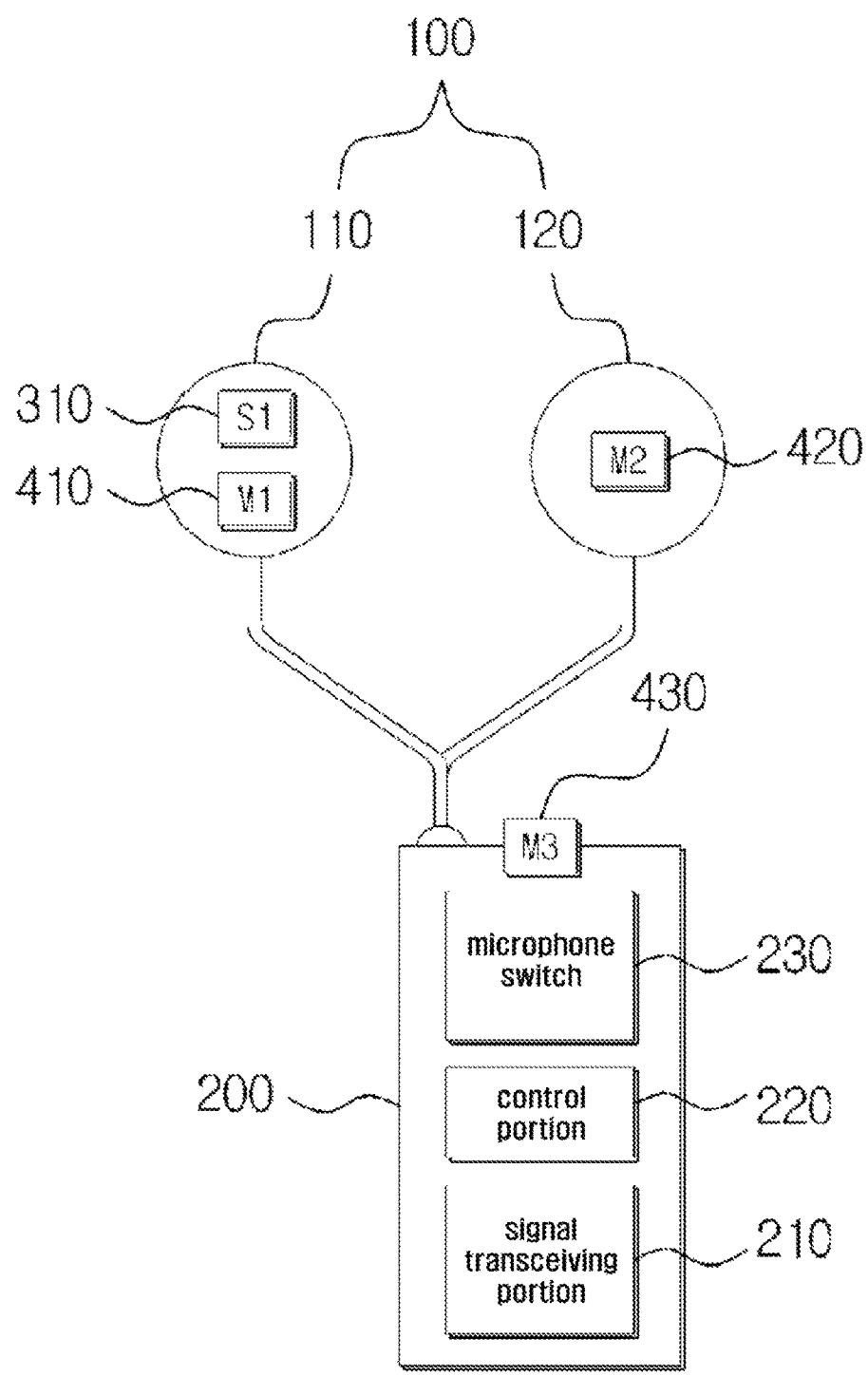
FIG. 6 is a fifth embodiment of the earset.

FIG. 6 is a fifth embodiment of the earset.

As shown in FIG. 6, the first earphone 110 includes a first microphone 410 and a first speaker 310, and a second earphone 120 includes a second microphone 420. The main body 200 includes a third microphone 430 to received voice signals provided from a user's mouth.

In the composition above, the control portion 220 detects noise signals, and if the detected level of noise signals is higher than the predetermined level, it selects the first microphone 410 and the second microphone 420, and if the detected level of noise signals is lower than the predetermined level, it selects the third microphone 430. Moreover, it also selects a microphone in accordance with a detection level of a user of an external device.

Since the earset collects sound from both ears through microphones arranged at both earphone portions, the earset easily amplifies voice signals with no additional amplifier, thus reducing inconvenience with low volume during a phone call.

Furthermore, by controlling an output of the first speaker 310 through an external circuit, the earset prevents echoing effects, thus enabling a call even in a noisy environment. Also, a user adjusts reception of the first microphone 410 and second microphone 420, thus preventing echoing effects.

In some embodiments, an output of the first speaker 310 is also controlled by a variable resistor or a fixed resistor.

Also, a user prevents echoing effects by automatically or manually adjusting at least one of the following: an output of the first speaker 310, the first microphone 410 or the second microphone 420.

Figure 7:
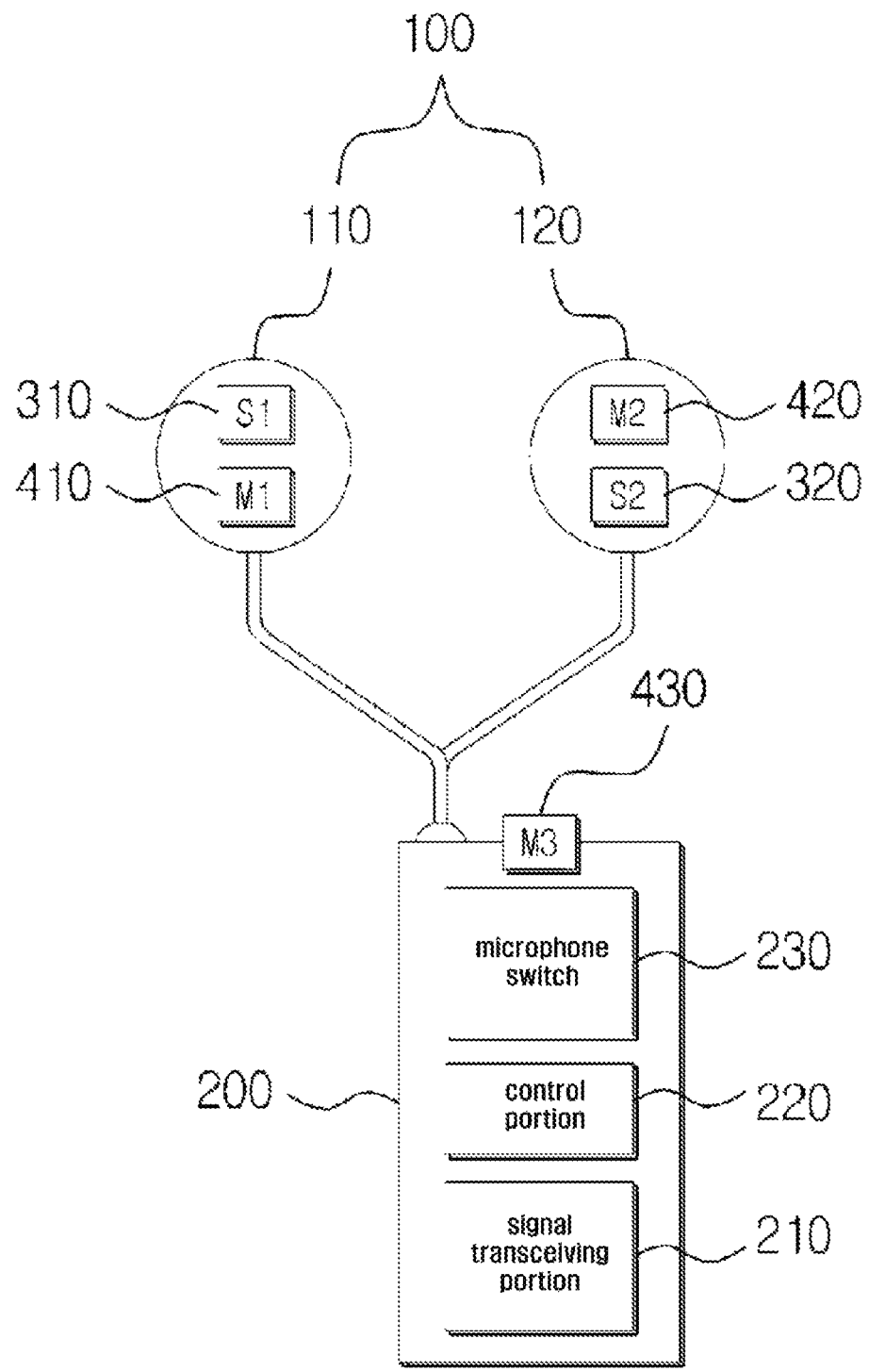
FIG. 7 is a sixth embodiment of the earset.

FIG. 7 is a sixth embodiment of the earset.

As shown in FIG. 7, in addition to the composition of the fifth embodiment, the earset further contains a second speaker 320 on the second earphone portion 120 that outputs sound or voice signals provided from external devices.

FIG. 8 is a seventh embodiment of the earset, and FIG. 9 is an embodiment that illustrates an echo offset means.

As shown in FIG. 8, in addition to the composition of the fifth embodiment, the earset further contains an echo offset means 240 on the first earphone portion 110 that reduces an echo factor included among voice signals received from the first microphone 410.

As shown in FIG. 9, the echo offset means 240 contains a filtering portion 242 that receives and filters sound signals or voice signals provided from external devices to a first speaker 310 and the second speaker 320, a phase inversion portion 244 that reverses sound or voice signals filtered and outputted from the filtering portion 242, and a signal synthesizing portion 246 that synthesizes sound or voice signals outputted from the phase inversion portion 244 in a phase-reversal way and inputted from the first microphone 410. Also, the echo offset means can be separately arranged at each earphone portion.

Also, in order to prevent echoing, a user can adjust an output of a first speaker 310 and a second speaker 320 or can adjust reception of a first microphone 410 and second microphone 420.

Figure 10:
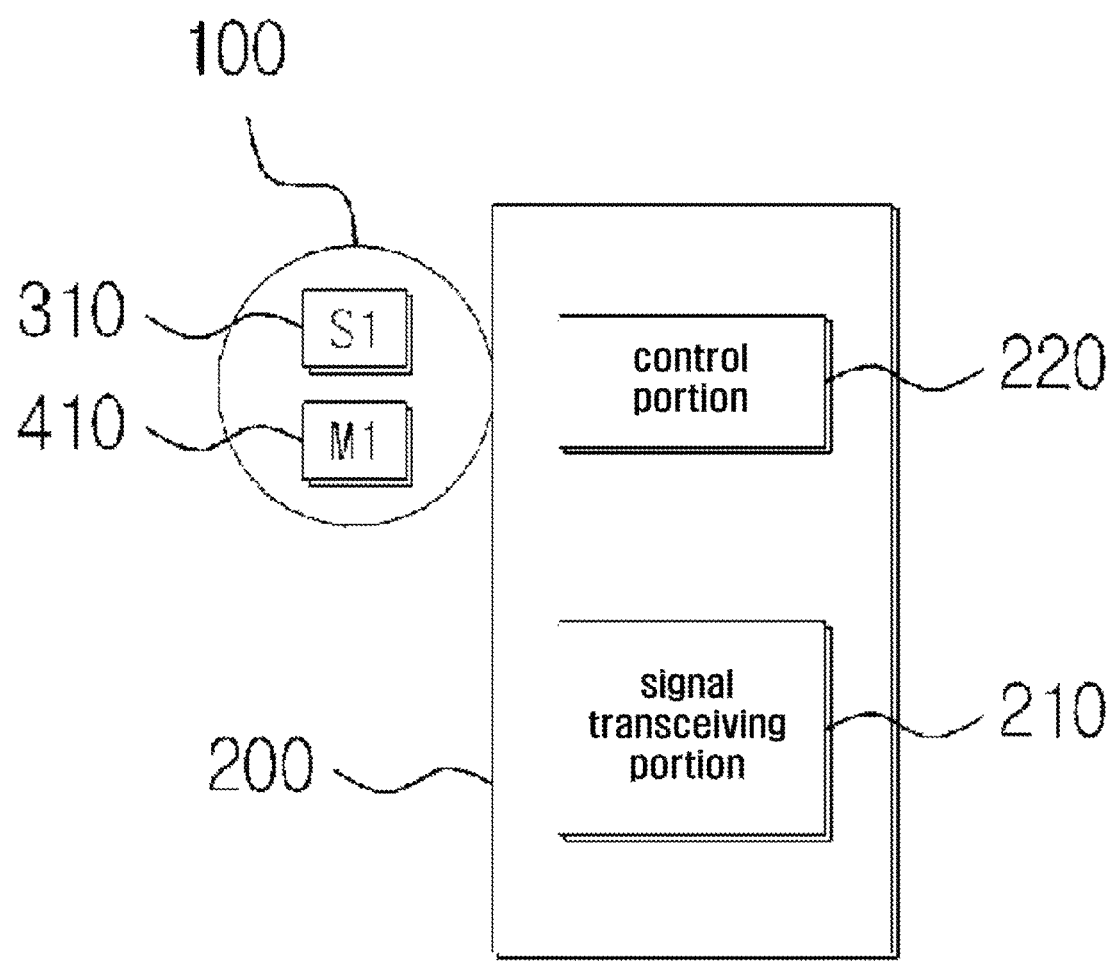
FIG. 10 is an eighth embodiment of the earset.

FIG. 10 is an eighth embodiment of the earset.

In the first embodiment and the seventh embodiment, the earphone portion 100 is separated into a first earphone portion 110 and a second earphone portion 120 and they are each worn on each side of ears. However, as shown in FIG. 10, it is also possible that a first speaker 310 and a first microphone 410 are equipped at one earphone portion 100 so that they are worn only on one ear.

In the case above, the earphone portion 100 is preferred to be connected with an external device in a wired or wireless way.

Also, it is noted that technical ideas of the third embodiment or the seventh embodiment described above are apparently addable to the eighth embodiment.

In an earset having the composition of the eighth embodiment, an earphone portion 100 contains a first speaker 310 and a first microphone 410, wherein the first speaker and the first microphone 410 of the earphone portion 100 are unified and are inserted into a user's external auditory canal, a user thus speaking and listening through the inserted earphone portion 100. That is, a first speaker 310 and a first microphone 410 are in the ear so that external noise does not come into a first microphone 410, thus making a user have a call in a noisy environment or a stormy weather and also enabling the user to have both hands available, thus enhancing user's work productivity. Also, in order to prevent echoing, a user can exploit methods presented in the fourth and seventh embodiments. Furthermore, in the eighth embodiment, a third microphone (not presented) is arranged at the outside so that a user chooses a microphone according to a level of noise signals.

Figure 11:
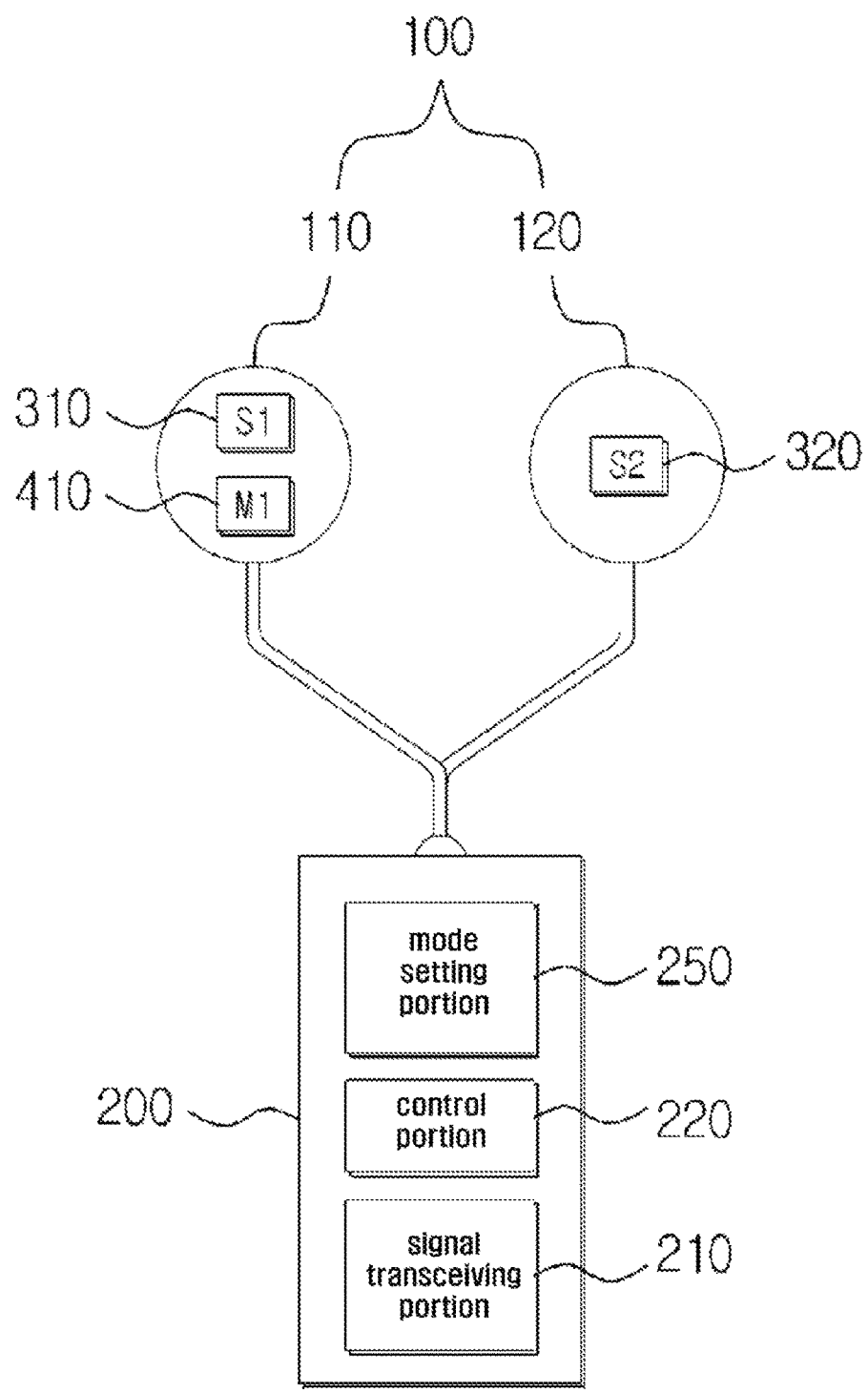
FIG. 11 is a ninth embodiment of the earset.

FIG. 11 is a ninth embodiment of the earset.

As shown in FIG. 11, a wireless earset ear-insertion-type microphone contains an earphone portion 100 and a main body 200. The earphone portion 100 contains a first speaker 310, a first earphone portion 110 that includes a first microphone 410 and is inserted into user's ear, and a second earphone portion 120 that includes a second speaker 320 and is inserted into user's ear.

The main body 200 includes a signal transceiving portion 210 that transceives sound signals with external devices, a control portion 220 that transmits voice signals received from a first microphone 410 and outputs sound signals received from external devices via the signal transceiving portion 210 into a first speaker 310 and a second speaker 320, and a mode setting portion that controls a calling mode and a playing mode.

An embodiment presented in FIG. 11 contains a microphone only in an earphone portion inserted into one side of ears. The earphone portion 110 includes a first microphone, and the first earphone portion 110 and the second earphone portion 120 contains speakers 310 and 320. A first earphone portion 110 including the first microphone 410 is inserted into either one side of human ears, and a second earphone portion is inserted into the other side.

The first earphone portion 110 contains a first speaker 310 and a first microphone 410, and a first speaker 310 and a first microphone 410 of a first earphone portion 110 are unified and inserted into a user's external auditory canal. A user speaks and listens through the earphone portion inserted into his or her ear. That is, since the speaker and microphone are in the ear and thus blocking external noise from coming into the microphone, a user can have a call even in a noisy environment and his or her hands are both available, therefore work productivity increases.

Herein, the speaker 310 and 320 are dynamic speakers, and in some embodiments, a closed-type balanced armature receiver and/or a piezoelectric pressure speaker are used. Also, it is preferred for the first microphone 410 to have a directional microphone component that is resistible to noise. Given that the first microphone 410 receives signals generated from the ear during a user's speech, it is preferred for it to have a directional microphone, though it is also possible to use an omnidirectional microphone.

Also, the externality of an earphone portion blocks noise generated by collision of winds with the earphone portion 110 and 120, and the externality of an earphone is made of silicon for waterproofing of the earphone portion 110 and 120.

The signal transceiving portion 210 is a portion that transceives signals with external devices. For an example, the transceiving portion 210, using the Bluetooth communication, transceives music signals and voice signals with external devices such as a mobile telecommunication terminal.

The control portion 220 controls earphone portions 110 and 120 and a signal transceiving portion 210. Basically, the control portion 220 transmits voice signals inputted into a first microphone 410 to an external device, delivers music signals to speakers 310 and 320, and controls the delivering of the voice signals received from the external device to a second speaker 320.

In some embodiments, the main body 200 includes a controlling device and a device that turns on and off an output of the earset. Furthermore, the earset contains a call button that determines whether to call to an external device such as a mobile telecommunication terminal.

A control portion of the earset controls at least one of the following: a first speaker 310 or a first microphone 410 included in a first earphone portion 110.

In the present disclosure, a calling mode is a mode that operates when a user makes a call with the other side via an external device such as a mobile telecommunication terminal, and a playing mode is a mode that operates when a user listens to a song or watches a video via an external device such as a mobile telecommunication terminal.

To play a video using a mobile telecommunication terminal, a constant stereo sound quality matters. Since the earset contains a first microphone 410 and a first speaker 310 in an earphone portion 110, with no additional control otherwise, an echoing or a howling effect occurs during a call because a voice outputted to a speaker 310 is inputted into a first microphone 410.

To prevent the echoing or howling, an output of a first speaker 310 or reception of a first microphone 410 is reduced, wherein an output adjusting circuit is inserted into a speaker's output terminal in order to reduce an output of the first speaker 310. However, it diminishes the low bandwidth during a playing of music, thus restricting the listening of music. Resolving this issue, a changeover switch is used so that in a playing mode an output of a first speaker 310 does not pass through an output adjusting circuit 252.

In order to resolve the issue, the control portion 130 controls at least one of the following: a first speaker 310 or a first microphone 410. If it controls them at the same time, it blocks the first speaker 310 and enables the first microphone 410 to input a voice.

A function of the control portion 220 and mode setting portion 250 to control a calling mode and a playing mode is figure out a calling or playing status manually or automatically so as to control at least one of the following: a first speaker 310 or a first microphone in the earphone portion 110. Also, the function of the control portion 220 and the mode setting portion 250 is equipped by an external device such as user's smartphone.

Figure 12:
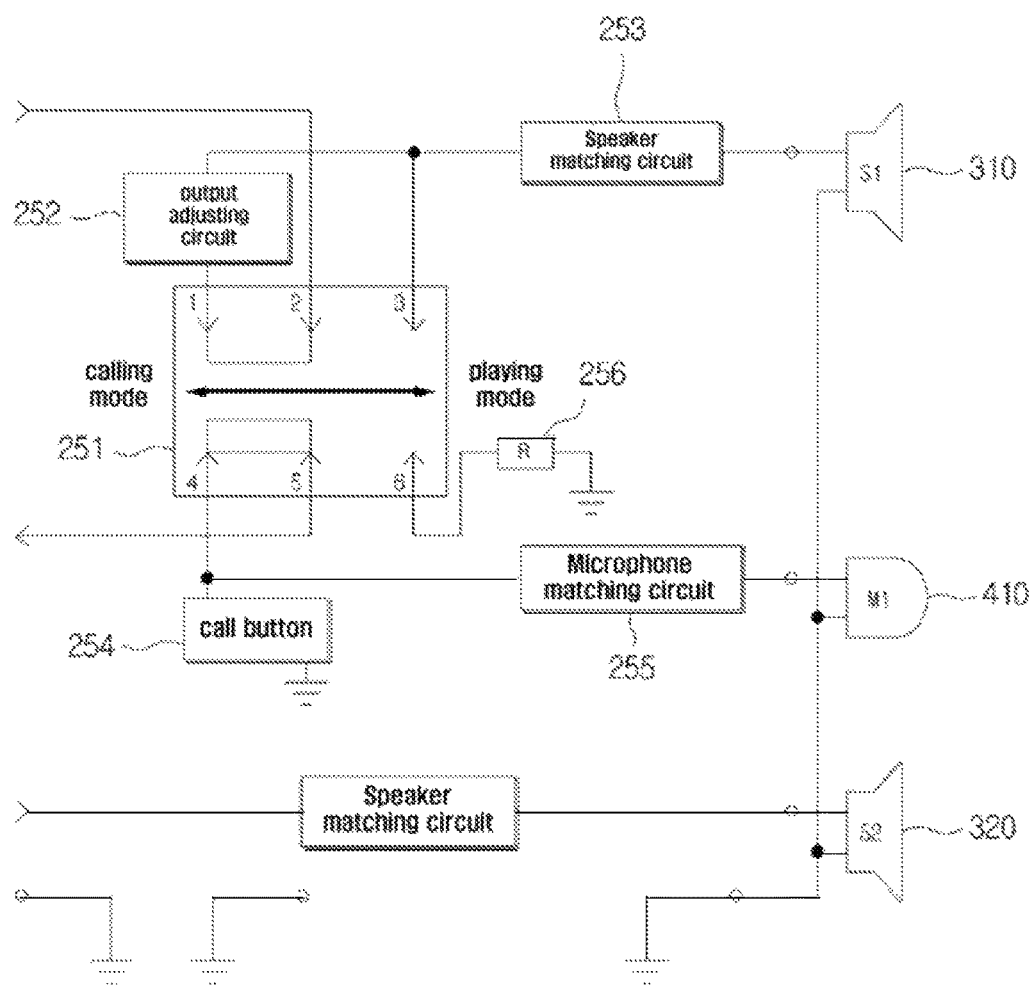
FIGS. 12 and 13 are a ninth embodiment of the earset, wherein they represent an embodiment of a composition of a mode setting portion.

In the present disclosure, the mode setting portion 25 is composed as shown in FIG. 12 so that a user makes a call clearly in a calling mode and listens to music with quality in a playing mode. Meanwhile, the control portion 220 and the mode setting portion 250 are interchangeable in their arrangement, and a wired earset does not necessarily have a signal transceiving portion 210.

Regarding a switch 251 in FIG. 12, in a calling mode, terminal 2 is connected with terminal 1, and terminal 5 with terminal 4. Also, in a playing mode, terminal 2 is connected with terminal 3, and terminal 5 with terminal 6.

Since terminal 1 of the switch 251 and a first speaker 310 are connected by a speaker output adjusting circuit 252, if the switch 251 is a calling mode, an output of a speaker passes through the speaker output adjusting circuit 252 and is outputted from a first speaker 310, and if the switch 251 is a playing mode, an output of a speaker is directly outputted from a first speaker 310 with no pass via the speaker output adjusting circuit 252. Herein, it is preferred for the speaker output adjusting circuit 252 to be composed with resistors. Meanwhile, when an output level of an external device such as a mobile telecommunication terminal is below the predetermined level, a speaker output adjusting circuit 252 is unnecessary since, if an output level of an external device is higher than the predetermined level, an output of a first speaker 310 is also high and is delivered to a first microphone, thus making an echo effect during a call.

For an output of a speaker to be delivered to a first speaker well, a speaker matching circuit composed of circuit R, L and C is further equipped between terminal 3 of the switch 251 and a first speaker 310.

For the same purpose above, an additional speaker matching circuit composed of circuit R, L, and C is further equipped at the second speaker 320, and it is noted that an additional speaker adjusting circuit to adjust an output of the second speaker 320 is further equipped.

Given a speaker output adjusting circuit and a speaker matching circuit is further equipped as described above, in a calling mode the volume of a first speaker 310 is lower than the volume of a second speaker 320, and the volume in a calling mode is lower both at the first speaker and the second speaker, since an output is adjusted in order to prevent the volume of the first speaker 310 from being inputted into the first microphone 410 and the volume of the second speaker 320 is adjusted in order to make balance with the first speaker 310.

In the end, a speaker output adjusting circuit and a speaker matching circuit perform an adjusting of the balance of left and right and an output of a quality of sound.

Furthermore, a call button 254 is connected with terminal 4 of the switch 251 so that a user operates it in a calling mode.

Furthermore, for an input of a microphone 410 to be delivered to the other side well, a microphone matching circuit 255 is equipped between terminal 4 of the switch 251 and a first microphone 410. Herein, for the microphone matching circuit 255 it is preferred to be composed of circuit R, L, and C including a zener diode, wherein the zener diode performs a function of protecting a first microphone 410.

Also, terminal 6 of the switch 251 is connected with dummy resistors 256. If terminal 5 of the switch is disconnected from terminal 4, that is, if the first microphone receives no input signal, since a microphone equipped at an external device such as a smartphone operates, the dummy resistors should be equipped so that the external device such as a smartphone recognizes that the first microphone 410 is still connected.

Unless the dummy resistors 256, if a user makes a call in a playing mode, a microphone equipped at an external device such as a smartphone operates, thus making impossible a call with the other side. Due to the dummy resistors 256, however, the dummy resistors 256 are recognized as an external microphone at an external device such as a smartphone, thus preventing the microphone from operating. Therefore, since a user's voice is not transmitted to the other side, he or she makes a call after changing a playing mode into a calling mode.

In this embodiment, the earset automatically or manually changes a playing mode to a calling mode by using a switch or voice recognition function or sensor or application, thus enabling to call with the other side through a microphone 410.

Therefore, in a playing mode the first microphone 410 does not operate, and if a user listens to music then a volume of an output of a speaker decreases. To make a call using a microphone at an external device such as a mobile telecommunication terminal during a playing mode, one just needs to remove dummy resistors 256.

Figure 13:
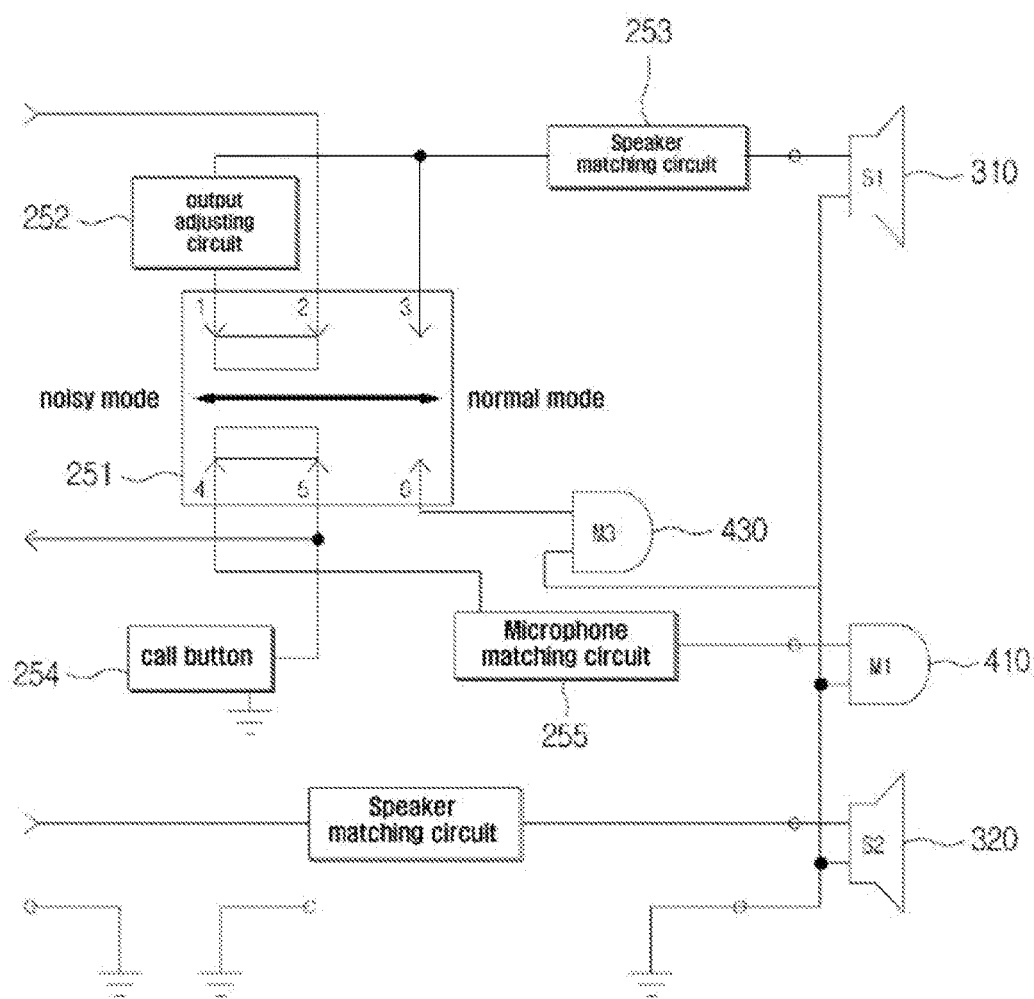

Meanwhile, as shown in FIG. 13, instead of dummy resistors, a second microphone 420 is connected with terminal 6 of the switch 251. Herein, the second microphone 420 is arranged at a main body 200 in FIG. 1 or between earphone portion 110, 120 and the main body 200. In FIG. 13, there are a noisy mode and a normal mode, where in a noisy mode than a normal mode, when a user listens to a song, the volume of a first speaker 310 is comparatively lower than the volume of a second speaker 320, and both the volumes of the first speaker 310 and second speaker 320 in a noisy mode are lower than the volumes in a normal mode, since an output adjusting circuit is needed in order to prevent echoing and howling, thus outputting the low volume of sound. However, when a signal outputted from an external device such as a mobile telecommunication circuit 252 is below the predetermined level, a speaker output adjusting circuit 252 is unnecessary. Meanwhile, FIG. 12 and FIG. 13 are different in that instead of dummy resistors 256, a second microphone, that is an external microphone, is electrically connected. Therefore, a calling mode in FIG. 12 and a playing mode is a noisy mode and a normal mode in FIG. 13 respectively. Therefore, it is preferred that every description of mode change regards a calling mode as a noisy mode, and a playing mode as a normal mode In FIG. 13, in a noisy environment, a user makes a call with the other side by using a switch or a voice recognition function or a sensor or an application via a first microphone 410 in the ear, automatically or manually changing a normal mode into a noisy mode, and in a quiet atmosphere, a user makes a call conveniently with a second microphone 420 in the externality by automatically or manually changing a noisy mode into a normal mode. Meanwhile, a second speaker 320 is presented in FIG. 12 and FIG. 13, which is an additional composition necessary for listening to music in a stereo sound quality. In other words, for a simple call with the other side, a second speaker 320 is unnecessary. Furthermore, if an external device is a radio transceiver, since it is only necessary for a call, a second speaker is unnecessary.

Figure 14:
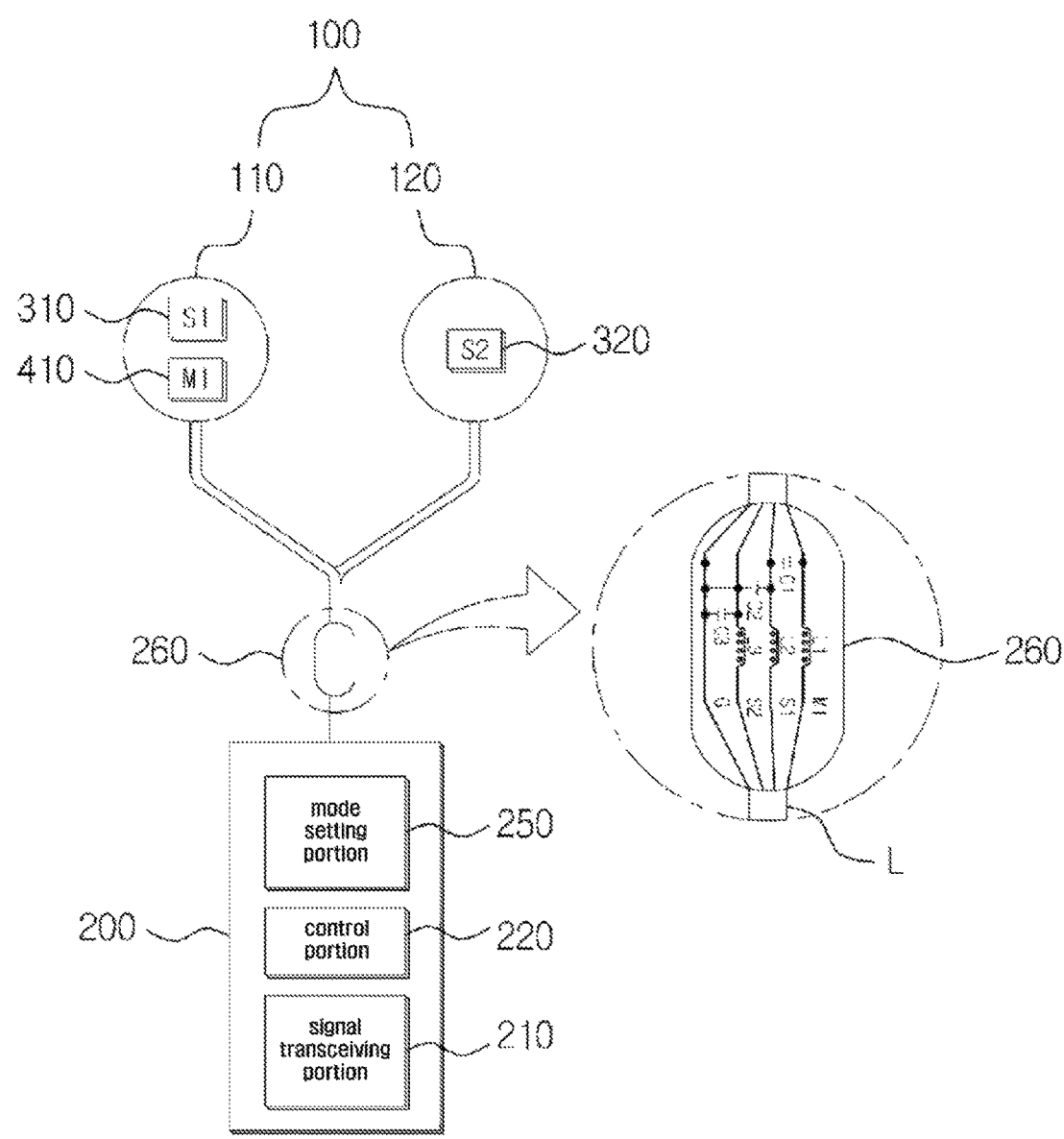
FIG. 14 is a tenth embodiment of the earset.

FIG. 14 is a tenth embodiment of the earset.

Although the composition in FIG. 14 is mostly equal with the composition in FIG. 11, an electromagnetic wave filtering portion 150 is further equipped on a wire portion that connects with an earphone portion 100 and a main body 200. The electromagnetic wave filtering portion 150, as shown in FIG. 14, is arranged on a lead wire L, or is arranged at earphone portions 110 and 120.

For the electromagnetic wave filtering portion 150, various forms of an electromagnetic interception device that those skilled in the art applies to are used.

For an instance, in some embodiments, an electromagnetic interception device such as the Korean Utility Model Registration No. 20-0317093 "Electromagnetic waves interception equipment for mobile communication equipment earphone" is used. A choke filter is installed at a high frequency entrance on a lead wire linked to earphone portion, thus blocking electromagnetic waves. Regarding this electromagnetic interception device, even if an electromagnetic wave received into an antenna is synchronized at a communication device, since the high frequency flowed into a lead wire of an earphone portion is blocked at the choke filter, electromagnetic waves are not induced into the earphone portion.

A composition presented at the right side in FIG. 14 is an enlarged image of circuit structure of an electromagnetic wave filtering portion 260. An RF filter (Low pass filter) as a choke filter is installed at a high frequency entrance of a lead wire L. In detail, the RF filter connects coil inductors L1, L2 and L3 to lead wires connected with a first microphone M1, a first speaker S1 and a second speaker S2 at an earphone portion, and it connects condensers C1, C2 and C3 between lead wires. By blocking a high frequency component from passing towards earphone portions E1 and E2 by means of coil inductors L1, L2 and L3, a user makes a call and listens to a quality of music. Meanwhile, it is noted that a choke filter is able to be substituted for other compositions that perform the same functions those skilled in the art are expected to know.

Mode Setting and Control

A control in accordance with a calling mode (noisy mode) and a playing mode (normal mode) is described more fully hereinafter. A mode control that will be described below is performed at a control portion 220 a mode setting portion 250 in FIG. 11. Depending on a wired or wireless earset, the control portion 220 or mode setting portion 250 is arranged between external devices such as mobile telecommunication terminals or at an external device.

A manual mode is where a user manually determines a calling mode (noisy mode) or a playing mode (normal mode) through an extra switch or voice recognition or a motion sensor, whereas an automatic mode is where a control portion 220 or a mode setting portion 250 sets up a calling mode (noisy mode) or a playing mode (normal mode) according to environments. Descriptions of how a manual mode or an automatic mode operates will be presented, that is, how a mode action proceed in accordance with what order or which setting.

First Embodiment of Mode Action

A control portion 220 or a mode setting portion 250 is basically controlled as a manual mode. In other words, a user of the earset selects a calling mode or playing mode. Though not presented in drawings, a mode action is manipulated by at least one of among a switch, voice recognition and a motion sensor arranged at a main body 200. If there is no selection by a user, the earset operates as a preset mode. Moreover, a mode is manually set up through an application run on a mobile telecommunication terminal.

Second Embodiment of Mode Action

A user might preset the earset to operate as a manual mode or an automatic mode. Herein, the mode is also set up by a switch, voice recognition or a motion sensor to choose a manual mode or an automatic mode. Also, the mode is set up through an application installed on a mobile telecommunication terminal.

If it is set up as a manual mode, the earset waits for an input of a user as shown in the first embodiment of a mode action, or it operates as a preset mode. If it is set up as an automatic mode, the earset operates as an automatic mode. Setting a manual mode or an automatic mode is called a first mode setting.

Third Embodiment of Mode Action

When a sound signal is delivered to earphone devices, if there is a manipulation of a user to the earset, the earset operates as a manual mode and if not, it operates as an automatic mode. Also, even in an automatic mode, if a user manually operates the earset, in accordance with the operation of a user, it operates as a calling mode or a playing mode. Distinguished from the second embodiment, a selection or setting of a playing mode or calling mode is called a second mode setting.

In a manual mode, the earset operates in accordance with user's inputs, yet it is noted that the earset operates in another way. A few embodiments will be described hereinafter.

First Embodiment of Manual Mode

As the most basic manual mode, a user selects a calling mode or a playing mode through an interface of a mobile telecommunication terminal linked with external terminals such as a switch, or an external device.

Second Embodiment of Manual Mode

When a user inputs a specific voice command via a first microphone 410 of the earset, the microphone recognizes the voice and an earphone device operates as a calling mode or a playing mode according to a voice command. For an example, if a user inputs "call" then a calling mode operates, and if a user inputs "play" then a playing mode operates.

Third Embodiment of Manual Mode

Through a specific operating sensor at the earset or a mobile telecommunication terminal, a calling mode or a playing mode is determined. For an instance, using gyro sensors, a user determines a calling mode or a playing mode by shaking his or her mobile telecommunication terminal with a constant number or moving with a specific shape. It is apparent that those skilled in the art determines a calling mode or playing mode with various sensors available to them.

Meanwhile, when a user pushes a call button arranged at a mobile telecommunication terminal or a main body of the earset due to a phone call during his or her listening to a music (a playing mode), a control portion controls the change of the playing mode into a calling mode with a call connection. Though an input means separated from a call button for changing into a calling mode is addable to the earset, it is preferable for a call button to make a call connection and change into a calling mode, since for a user it is cumbersome to input again for changing into a calling mode after pushing a call button and it might cause an echoing effect.

Meanwhile, the embodiments described above in the manual mode is able to be set up or operated by user's manipulation via applications run on a mobile telecommunication terminal.

Embodiments of an automatic mode will be described more in detail. In the description below of an automatic mode, it is assumed that a control portion 220 takes a control of the whole earset. Also, an automatic mode is controllable by the mode setting portion 250.

First Embodiment of Automatic Mode

During a calling or playing a song, a mobile telecommunication terminal has its own identification number or code. For an example, it has an identification code 001 (that is, a sign for a calling status) during a calling and an identification code 002 (that is, a sign for playing a song)/Although those identification signs or codes is not necessarily coincident in every mobile telecommunication terminal, identification codes defined as specific actions are fixed in each terminal device. The first embodiment represents an exploit of identification signals or codes. When a mobile telecommunication terminal, an external device, is on operation of calling, it transceives voice signals with a signal transceiving portion 210, whereas the signal transceiving portion 210 receives the identification signals or identification codes. If code 001 is received in accordance with the identification signals or identification codes, a control portion 220 controls the earset device in accordance with the calling mode. In other words, in a calling mode an output of a first speaker is blocked, and a first microphone 410 receives voice and a second speaker 320 outputs the voice of the other side. If code 002 is received, a control portion 220 controls the earset device in accordance with the playing mode. In a playing mode, sound is outputted from all speakers 310 and 320, thus letting a user enjoy stereo sound.

Second Embodiment of Automatic Mode

With the increasing of smartphones, there are a variety of mobile telecommunication terminals equipped with various functions. Smartphones perform many functions via each application. Voice calls, MP3 music plays or video plays are all performed via separated applications. When applications operate, as described in the first embodiment, each identification signal or identification code is generated. Therefore, a control portion 220 receives signals generated by the operation of applications, thus controlling the earset to operate as a calling mode or a playing mode.

Third Embodiment of Automatic Mode

Furthermore, an application for controlling the earset is installed on a smartphone, and the earset is controlled by a control application. That is, a control portion 220 does not control performance of a calling mode or a playing mode but a control application analyzes to decide whether to perform a calling mode or a playing mode and, by sending the result of the analysis, it performs a calling mode or a playing mode.

Fourth Embodiment of Automatic Mode

In another embodiment, a control portion 220 analyzes sound signals received into the earset device, and based on the result, sets up a calling mode or a playing mode. Sound signals have two types: voice signals or sound music signals. Voice signals are merely composed of conversations of human speech, and music signals are signals generated when music is played.

Sound is physically represented as a waveform. Signal frequency, wave height or wave pattern is analyzed. In this embodiment, by analyzing them, one can distinguish sound signals from music signals.

It is obvious for those skilled in the art to perform in a various way an analysis of frequency height, change and regularity within a specific interval of sound signals in order to distinguish sound signals from music signals. For an instance, sound signals are distinguished from music signals in accordance with whether an average of frequency change disclosed in the Korean Patent Publication 10-2010-0098100 exceeds a threshold.

A control portion 220 distinguishes sound signals (noisy environment) and music signals (quiet environment) and determines a setting of a calling mode (noisy mode) or a playing mode (music mode). Furthermore, as described in the third embodiment, by an application run on a smartphone, it decides if sound signals outputted from a smartphone are sound signals or music signals and sends the result to the earset so as to control an automatic mode.

Figure 15:
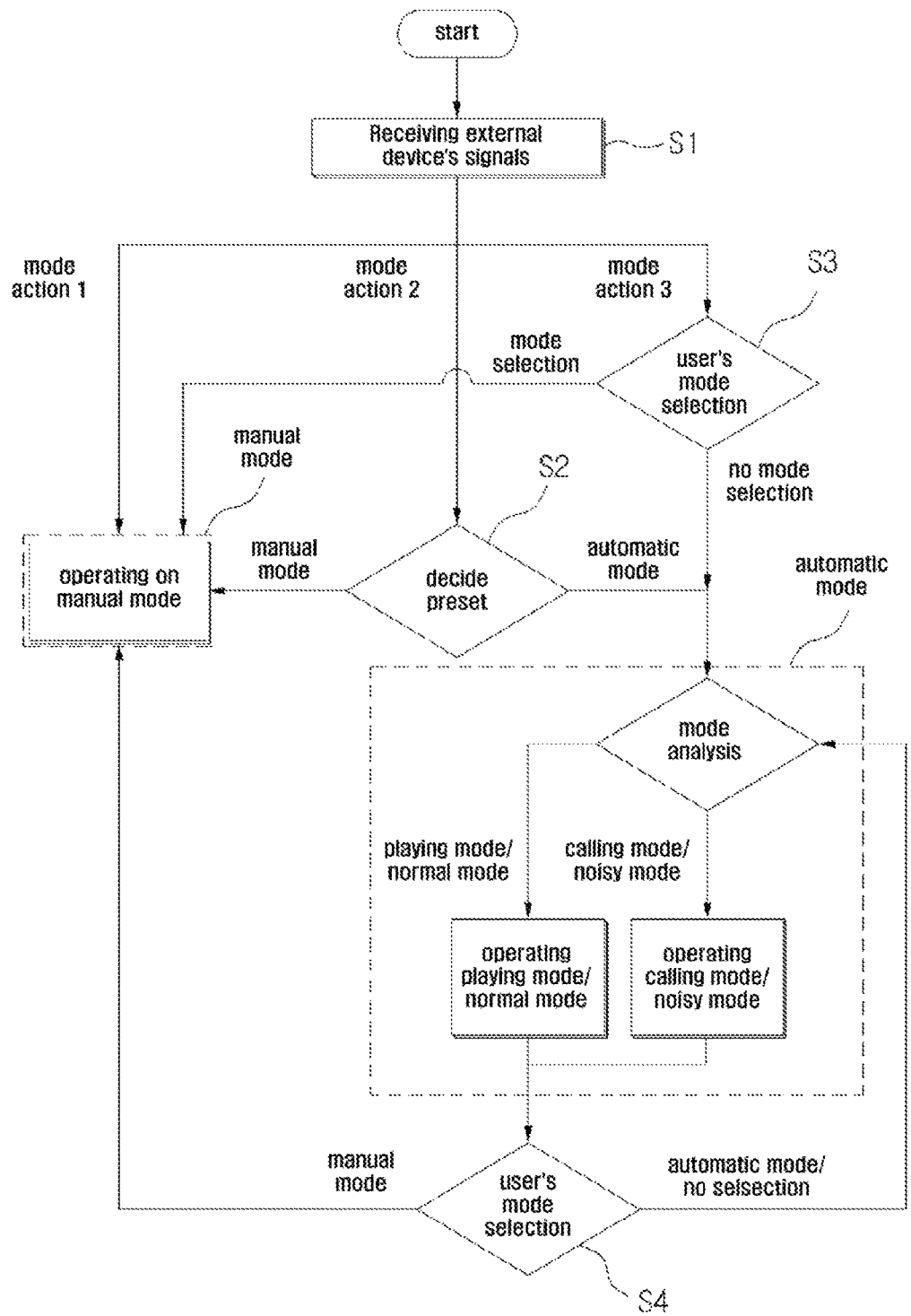
FIG. 15 is a flowing chart of the earset.

FIG. 15 is a flowing chart of the earset.

Mode action 1, mode action 2 and mode action 3 each represents the order of execution of the described modes in accordance with the embodiments. A manual mode and automatic mode is marked as a box of dotted lines. A dotted line box on the left in FIG. 13 represents a manual mode, whereas a box on the right is an automatic mode. Meanwhile, descriptions for FIG. 15 follow the descriptions for FIG. 12, which also applies to FIG. 13. In other words, a calling mode and a playing mode in FIG. 12 are correspondent to a calling mode and a playing mode in FIG. 13.

Mode action 1 is a selection with no automatic mode where a user manually selects a calling mode or a playing mode.

In mode action 2, the earset operates in accordance with a user's predetermined setting. Thus, a decision step S2 whether a preset mode after external device's signals are received (S1) is manual or automatic is needed. A preset mode operates in accordance with the decision. If a user does not choose a first mode while the preset mode is a manual mode (a first mode), a second mode that was set up just before operates.

In mode action 3, if a user chooses either a calling mode or a playing mode (second mode) after external device's signals are received (S1), a manual mode is activated and executes the mode, or if there is no input from a user, an automatic mode operates. During an operation of an automatic mode, if a user manually selects a playing mode or calling mode (S4), the mode is changed into a manual mode, or if there is no input from a user, it continually operates as an automatic mode.

Automatic mode is described herein more in detail. As described in the embodiments of an automatic mode, a mode analysis is performed in a various way. If the received signals are decided music signals (quiet environment), the earset operates as a playing mode (normal mode) through a control portion 220. On the contrary, if the received sound signals are decided voice signals (noisy environment), the earset operates as a calling mode (noisy mode) through a control portion 220.

In concluding the detailed description, those skilled in the art will appreciate that many variations and modifications can be made to the preferred embodiments without substantially departing from the principles of the some embodiments described above. Therefore, the described some embodiments are used in a generic and descriptive sense only and not for purposes of limitation.

The invention claimed is:

1. An earset using an ear-insertion-type microphone, the earset comprising:
a first earphone portion containing a first speaker that outputs sound signals or voice signals provided from an external device and a first microphone that receives user's voice signals provided via a user's external auditory canal and configured to be inserted into a first external auditory canal of the user;
a second earphone portion containing a second speaker that outputs sound signals or voice signals provided from the external device, and configured to be inserted into a second external auditory canal of the user; and
a main body connected with the first earphone portion and the second earphone portion and configured to set up a calling mode or a playing mode, based on the sound outputted from the first speaker or the second speaker,
wherein the main body sets up the calling mode when a control application installed in the external device connected with the earset determined that sound outputted from the first speaker or the second speaker only includes human voices, and
wherein the main body sets up the playing mode when the control application installed in the external device connected with the earset determined that the sound outputted from the first speaker or the second speaker includes music,
wherein the first speaker is, in the playing mode, configured to output sound without level adjustment, and the first speaker is, in the calling mode, configured to output sound with level adjustment,
wherein the second speaker is configured to output sound, in both of the calling mode and the playing mode, and
wherein the first microphone is, in the calling mode, configured to receive the user's voice signals, and the first microphone is, in the playing mode, configured not to receive the user's voice signals.

2. The earset of claim 1,
wherein the earset further contains a speaker matching circuit separately equipped at the first speaker and/or the second speaker, a microphone matching circuit equipped at the first microphone, and dummy resistors recognized as the first microphone.

3. An earset using an ear-insertion-type microphone, the earset comprising:
a first earphone portion containing a first speaker that outputs sound signals or voice signals provided from an external device and a first microphone that receives user's voice signals provided via a user's external auditory canal and configured to be inserted into a first external auditory canal of the user;
a second earphone portion containing a second speaker that outputs sound signals or voice signals provided from the external device and configured to be inserted into a second external auditory canal of the user; and
a main body connected with the first earphone portion, the second earphone portion and an external device, and configured to set up a calling mode or a playing mode, based on the sound outputted from the first speaker or the second speaker,
wherein the main body sets up the calling mode when a control application installed in the external device connected with the earset determined that sound outputted from the first speaker or the second speaker only includes human voices, and
wherein the main body sets up the playing mode when the control application installed in the external device connected with the earset determined that the sound outputted from the first speaker or the second speaker includes music,
wherein the first speaker is, in the playing mode, configured to output sound without level adjustment, and the first speaker is, in the calling mode, configured to output sound with level adjustment,
wherein the second speaker is configured to output sound, in both of the calling mode and the playing mode, and
wherein the first microphone is, in the calling mode, configured to receive the user's voice signals, and the first microphone is, in the playing mode, configured not to receive the user's voice signals.

4. The earset of claim 3,
wherein the earset further contains a switch with a noisy mode and a normal mode that operates the first microphone in a noisy mode and operates a second microphone in a normal mode, and a mode setting portion containing a speaker adjusting circuit that adjusts an output of the first speaker and/or the second speaker in the noisy mode.

\* \* \* \* \*